US011459972B1

(12) United States Patent
Marchionda et al.

(10) Patent No.: US 11,459,972 B1
(45) Date of Patent: Oct. 4, 2022

(54) MONITORING SYSTEM FOR IDENTIFYING AN ENGINE BANK WITH A MALFUNCTIONING FUEL INJECTOR

(71) Applicant: Caterpillar Inc., Peoria, IL (US)

(72) Inventors: Michael Marchionda, Washington, IL (US); Dereck G. Heffron, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/448,477

(22) Filed: Sep. 22, 2021

(51) Int. Cl.
F02D 41/22 (2006.01)
F02D 41/14 (2006.01)
F02D 41/26 (2006.01)

(52) U.S. Cl.
CPC ....... F02D 41/221 (2013.01); F02D 41/1446 (2013.01); F02D 41/26 (2013.01); F02D 2041/224 (2013.01); F02D 2041/228 (2013.01); F02D 2200/021 (2013.01); F02D 2200/101 (2013.01)

(58) Field of Classification Search
CPC .... F02D 41/221; F02D 41/1446; F02D 41/26; F02D 2041/224; F02D 2041/228; F02D 2200/021; F02D 2200/101
See application file for complete search history.

(56) References Cited

U.S. PATENT DOCUMENTS

| | | | | |
|---|---|---|---|---|
| 5,566,091 A * | 10/1996 | Schricker | ............ | G01M 15/048 340/439 |
| 5,585,553 A * | 12/1996 | Schricker | ................ | F02B 77/08 73/114.37 |
| 5,983,876 A * | 11/1999 | Irons | ................... | F02D 41/1497 123/478 |
| 6,092,016 A * | 7/2000 | Sarangapani | ....... | F02D 41/1443 123/676 |
| 6,675,639 B1 * | 1/2004 | Schricker | ............ | G01M 15/102 73/114.01 |
| 7,181,370 B2 * | 2/2007 | Furem | ..................... | E02F 9/205 701/50 |
| 7,483,774 B2 * | 1/2009 | Grichnik | ................ | G06Q 10/06 701/32.9 |

(Continued)

FOREIGN PATENT DOCUMENTS

| | | |
|---|---|---|
| CN | 108825418 B | 8/2020 |
| GB | 2491592 A | 12/2021 |
| KR | 101967458 B1 | 4/2019 |

Primary Examiner — Carl C Staubach
(74) Attorney, Agent, or Firm — Harrity & Harrity, LLP (57) ABSTRACT

A monitoring system obtains sensor data associated with operation of an engine, of a machine, that includes a first engine bank with a first set of fuel injectors and a second engine bank with a second set of fuel injectors. The monitoring system determines, based on the sensor data, a first temperature value that is representative of temperature differences between the first engine bank and the second engine bank for a period of time when the engine operated in a particular operation state, and a second temperature value that is representative of temperature differences between the first engine bank and the second engine bank for one or more prior periods of time when the engine operated in the particular operation state. The monitoring system determines, based on the first temperature value and the second temperature value, that a fuel injector malfunction condition occurred during the period of time.

20 Claims, 9 Drawing Sheets

(56) References Cited

U.S. PATENT DOCUMENTS

| | | | |
|---|---|---|---|
| 2010/0025500 A1 | 2/2010 | Pollard et al. | |
| 2012/0215424 A1* | 8/2012 | Dolker | F02D 41/3863 |
| | | | 701/104 |
| 2014/0352659 A1* | 12/2014 | Glugla | F02D 35/028 |
| | | | 123/350 |
| 2018/0156149 A1* | 6/2018 | Campagna | G01M 15/05 |

* cited by examiner

FIG. 3

MONITORING SYSTEM FOR IDENTIFYING AN ENGINE BANK WITH A MALFUNCTIONING FUEL INJECTOR

TECHNICAL FIELD

The present disclosure relates generally to determining that a fuel injector, of a plurality of fuel injectors of an engine, has malfunctioned and, for example, to identifying an engine bank of the engine with the malfunctioning fuel injector.

BACKGROUND

An internal combustion engine of a machine includes a plurality of fuel injectors that respectively provide fuel to a plurality of cylinders (e.g., during a fuel injection process) to enable combustion within the plurality of cylinders (e.g., during a combustion process), which causes the engine to provide power for operation and/or locomotion of the machine. In some cases, a fuel injector, of the plurality of fuel injectors, may malfunction and thereby proper combustion may not occur in a corresponding cylinder, of the plurality of corresponding cylinders. This may result in a reduced performance of the engine (e.g., a reduced power output) and/or damage to the engine. Typically, determining whether a fuel injector has failed requires performing diagnostics on each of the plurality of fuel injectors.

U.S. Pat. No. 6,092,016 (the '016 patent) discloses a method for diagnosing an engine using a computer based model of exhaust temperature. The '016 patent discloses a diagnostic controller for receiving sensor information from sensors of an engine, generating a computerized model of exhaust temperature of the engine, and diagnosing the engine using the model. An exhaust temperature model generates a modeled or predicted right exhaust temperature, a modeled or predicted left exhaust temperature, and a modeled or predicted average exhaust temperature, which are then used to diagnose the engine. Per the '016 patent, a left difference value is determined by taking the difference between the modeled and actual exhaust temperatures of a left bank of the engine, and a right difference value is determined by taking the difference between the modeled and actual exhaust temperatures of the right bank of the engine. Degradation of a fuel injector is determined whenever high or low limits for either the left difference value, the right difference value, or both, are exceeded.

While the '016 patent discloses some benefits, the present disclosure is associated with other benefits, such as determining whether a fuel injector malfunctioned based on a current and historical performance of an engine and identifying an engine bank with a malfunctioning fuel injector. The monitoring system of the present disclosure solves one or more of the problems set forth above and/or other problems in the art.

SUMMARY

Some implementations described herein relate to a monitoring system. The monitoring system may include one or more memories and one or more processors coupled to the one or more memories. The monitoring system may be configured to obtain sensor data associated with operation of an engine of a machine. The monitoring system may be configured to determine, based on the sensor data, that the engine operated in a particular operation state for a period of time. The monitoring system may be configured to determine, based on determining that the engine operated in the particular operation state for the period of time, that the sensor data satisfies one or more data accuracy criteria. The monitoring system may be configured to determine, based on the sensor data and determining that the sensor data satisfies the one or more data accuracy criteria, a first temperature value that is representative of temperature differences between the first engine bank and the second engine bank for the period of time. The monitoring system may be configured to determine, based on determining that the sensor data satisfies the one or more data accuracy criteria, a second temperature value that is representative of temperature differences between the first engine bank and the second engine bank for one or more prior periods of time when the engine operated in the particular operation state. The monitoring system may be configured to determine, based on the first temperature value and the second temperature value, whether a fuel injector malfunction condition occurred during the period of time. The monitoring system may be configured to cause, based on determining whether the fuel injector malfunction condition occurred during the period of time, one or more actions to be performed.

Some implementations described herein relate to a method. The method may include obtaining, by a monitoring system, sensor data associated with operation of an engine of a machine, where the engine includes a first engine bank with a first set of fuel injectors and a second engine bank with a second set of fuel injectors. The method may include determining, by the monitoring system and based on the sensor data, that the engine operated in a particular operation state for a period of time. The method may include determining, by the monitoring system and based on the sensor data and determining that the engine operated in the particular operation state for the period of time, a first temperature value that is representative of temperature differences between the first engine bank and the second engine bank for the period of time. The method may include determining, by the monitoring system and based on determining that the engine operated in the particular operation state for the period of time, a second temperature value that is representative of temperature differences between the first engine bank and the second engine bank for one or more prior periods of time when the engine operated in the particular operation state. The method may include determining, based on the first temperature value and the second temperature value, whether a fuel injector malfunction condition occurred during the period of time. The method may include causing, based on determining whether the fuel injector malfunction condition occurred during the period of time, one or more actions to be performed.

Some implementations described herein relate to a non-transitory computer-readable medium that stores a set of instructions for a monitoring system. The set of instructions, when executed by one or more processors of the monitoring system, may cause the monitoring system to obtain sensor data associated with operation of an engine of a machine. The set of instructions, when executed by one or more processors of the monitoring system, may cause the monitoring system to determine, based on the sensor data, a first temperature value that is representative of temperature differences between the first engine bank and the second engine bank for a period of time when the engine operated in a particular operation state. The set of instructions, when executed by one or more processors of the monitoring system, may cause the monitoring system to determine a second temperature value that is representative of temperature differences between the first engine bank and the second engine bank for one or more prior periods of time when the engine operated in the particular operation state. The set of instructions, when executed by one or more processors of the monitoring system, may cause the monitoring system to determine, based on the first temperature value and the second temperature value, whether a fuel injector malfunction condition occurred during the period of time. The set of instructions, when executed by one or more processors of the monitoring system, may cause the monitoring system to cause, based on determining whether the fuel injector malfunction condition occurred during the period of time, one or more actions to be performed.

DETAILED DESCRIPTION

FIGS. 1A-1G are diagrams of an example implementation 100 associated with identifying an engine bank with a malfunctioning fuel injector, which is applicable to any machine that includes an engine with multiple engine banks. As shown in FIGS. 1A-1G, example implementation 100 includes a machine 102 and a monitoring system 104, which are described in more detail below in connection with FIG. 2 and FIG. 3.

Machine 102 (and the term "machine") may refer to any machine that performs an operation associated with an industry such as, for example, mining, construction, farming, transportation, or any other industry. As some examples, the machine 102 may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, marine equipment, stationary equipment, generator sets, pumps, or the like. For example, as shown in FIG. 1A, the machine 102 may be a dozer.

Figure 1A:
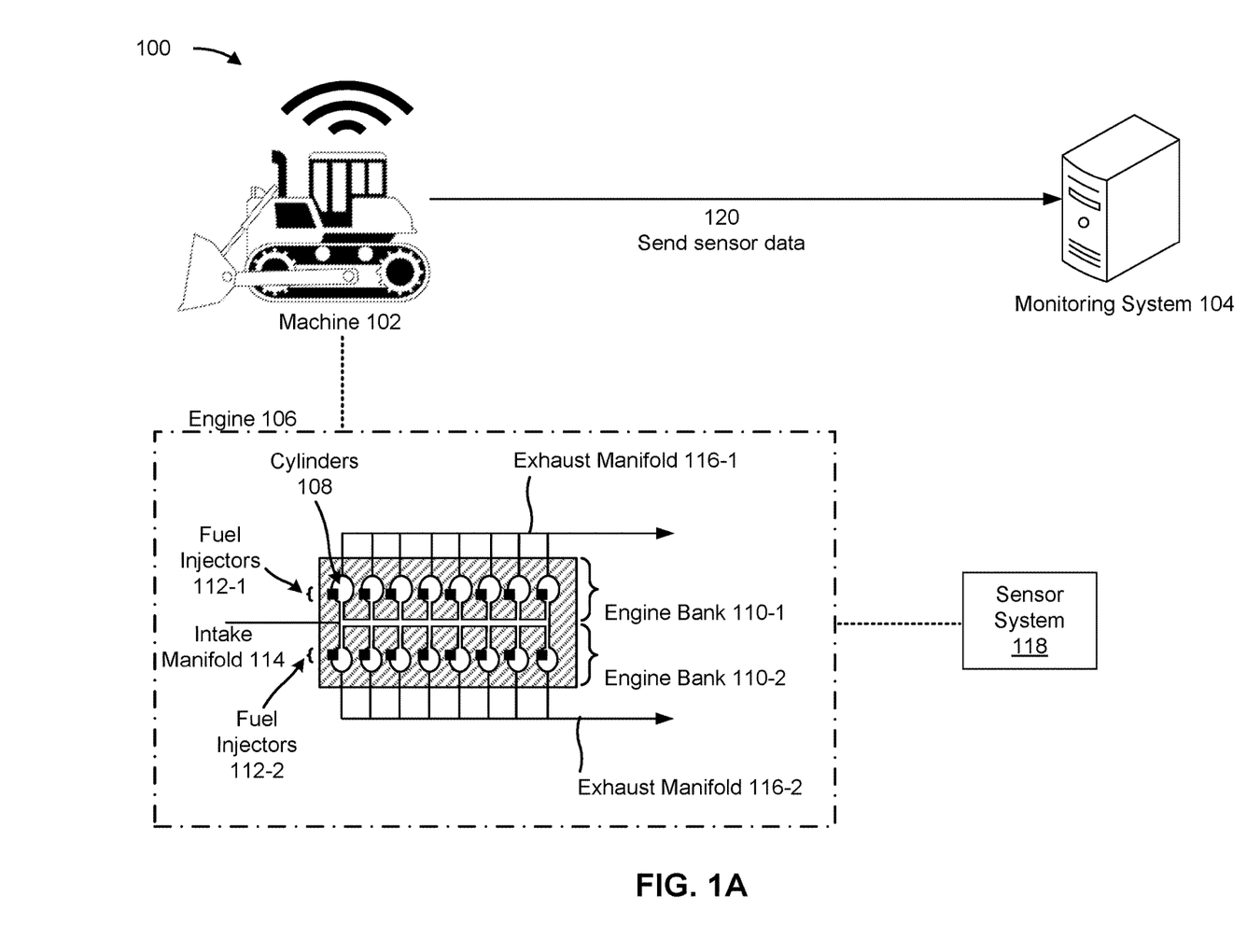
FIGS. 1A-1G are diagrams of an example implementation associated with identifying an engine bank with a malfunctioning fuel injector.

As further shown in FIG. 1A, the machine 102 may include an engine 106 (e.g., for providing power for operation and locomotion of the machine 102). The engine 106 includes a plurality of cylinders 108 coupled to a crankshaft within a case. The crankshaft is connected to a plurality of pistons that are respectively housed (e.g., slidably and reciprocally) within the plurality of cylinders 108. Cylinder heads cover cylinders 108 to form combustion chambers that power the crankshaft to provide a useful mechanical working motion to a flywheel and/or output of the engine 106. The plurality of cylinders 108 may be arranged in a plurality of rows, where each row is associated with an engine bank 110, of a plurality of engine banks 110 (shown as a first engine bank 110-1 and a second engine bank 110-2 in FIG. 1A), of the engine 106.

The engine 106 includes a plurality of fuel injectors 112 that are respectively included in the plurality of cylinders 108. The plurality of fuel injectors 112 may be configured to inject fuel into the plurality of cylinders 108 (e.g., during a fuel injection process) to enable combustion within the plurality of cylinders 108 (e.g., during a combustion process). The plurality of fuel injectors 112 may be arranged in a plurality of rows (e.g., within the plurality of rows of the plurality of cylinders 108), where each row is associated with an engine bank 110, of the plurality of engine banks 110. In this way, as shown in FIG. 1A, the first engine bank 110-1 includes a first set of fuel injectors 112-1 (e.g., one or more fuel injectors 112-1), and the second engine bank 110-2 includes a second set of fuel injectors 112-2 (e.g., one or more fuel injectors 112-2).

Air is provided to the plurality of cylinders 108 via an intake manifold 114. The intake manifold 114 may be a common intake manifold 114 fluidly connected to each of the plurality of cylinders 108. During a combustion process, the plurality of cylinders 108 may produce an exhaust gas that exits the engine 106 via an exhaust manifold 116. The exhaust manifold 116 may be a common exhaust manifold 116 fluidly connected to each of the plurality of cylinders 108 or a plurality of exhaust manifolds 116 (shown as exhaust manifold 116-1 and exhaust manifold 116-2) that are respectively connected to sets of the plurality of cylinders 108.

The machine 102 may include a sensor system 118 that collects sensor data related to operation of the engine 106. The sensor system 118 may include physical sensors and/or any appropriate type of control system that generates values of sensing parameters based on a computational model and/or one or more measured parameters. As used herein, "sensing parameters" may refer to parameters that are directly measured and/or estimated by one or more sensors (e.g., physical sensors, virtual sensors, and/or the like). Example sensors may include temperature sensors (e.g., to measure a temperature of exhaust gas associated with the first engine bank 110-1 and/or the second engine bank 110-2, such as in terms of degrees Celsius (C)), speed sensors (e.g., to measure a speed of the engine 106, such as in terms of revolutions per minute (RPM)), and/or pressure sensors (e.g., to measure a boost pressure associated with the engine 106, such as in terms of kilopascals (kPa)), among other examples. Sensing parameters may also include any output parameters that may be measured indirectly by physical sensors and/or calculated based on readings of physical sensors, such as a load of the engine 106.

The sensor data may include, for example, information concerning a speed of the engine 106, information concerning a load of the engine 106, information concerning a boost pressure of the engine 106, information concerning an exhaust gas temperature associated with the first engine bank 110-1, and/or information concerning an exhaust gas temperature associated with the second engine bank 110-2. For example, the sensor data may include a speed of the engine 106, a load of the engine 106, a boost pressure of the engine 106, an exhaust temperature associated with the first engine bank 110-1, and/or an exhaust temperature associated with the second engine bank 110-2 at one or more instants of time during an operation period of time of the machine 102.

As further shown in FIG. 1A, and by reference number 120, the machine 102 may send the sensor data to the monitoring system 104. For example, the machine 102 may send, to the monitoring system 104, the sensor data to the monitoring system 104 using a communication component (e.g., a wired or wireless communication device, not shown in FIG. 1A) of the machine 102. The machine 102 may send the sensor data to the monitoring system 104 after an operation period of time of the machine 102 has concluded. For example, the machine 102 may send the sensor data at an end of a working day associated with operation of the machine 102. In this way, the monitoring system 104 may obtain the sensor data after the operation period of time of the machine 102 has concluded.

Figure 1B:
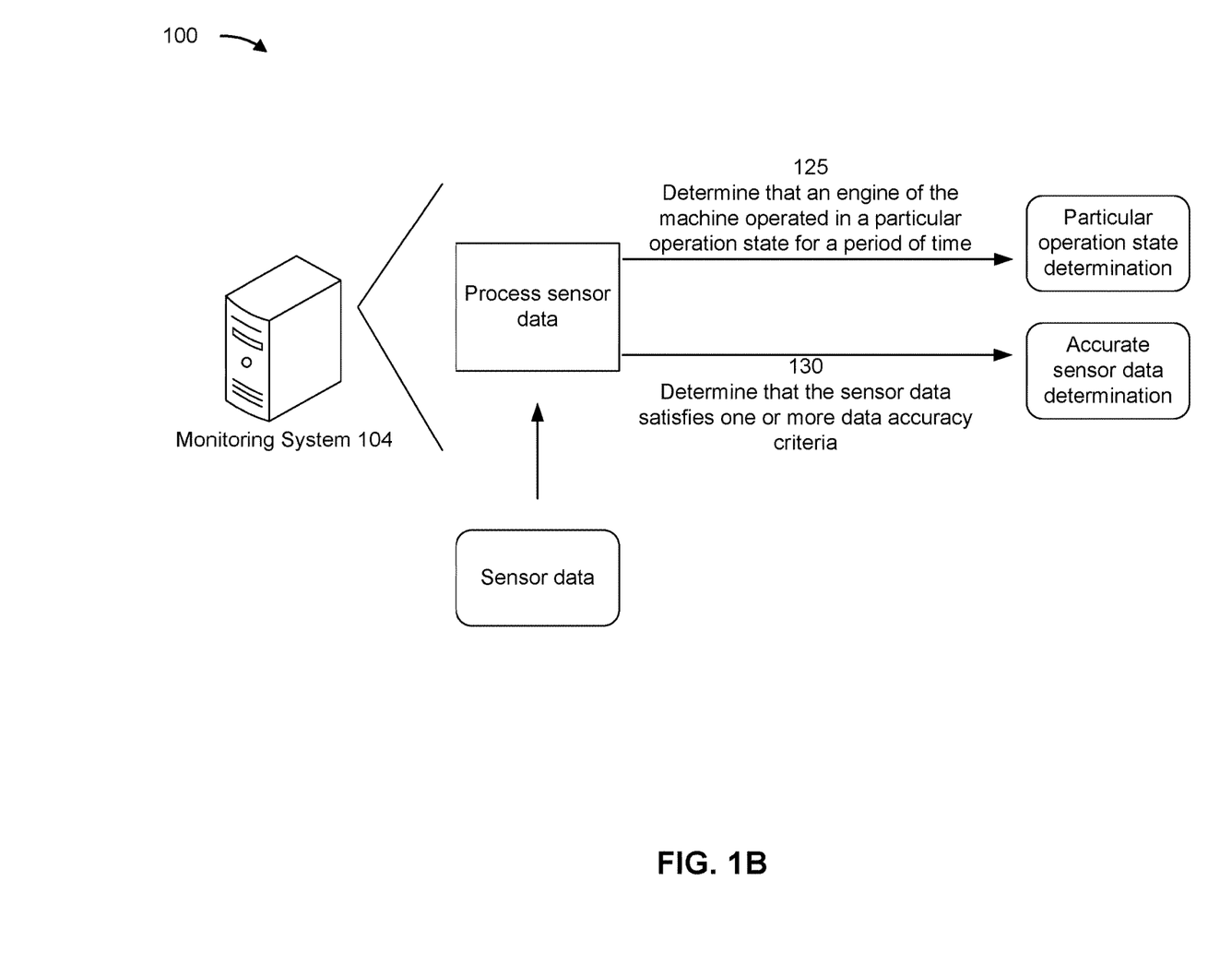

As shown in FIG. 1B, and by reference number 125, the monitoring system 104 may determine that the engine 106 operated in a particular operation state (e.g., a "high load" operation state or another operation state) for a period of time (e.g., based on the sensor data). For example, the monitoring system 104 may determine, based on the sensor data, whether one or more engine operation criteria are satisfied for the period of time, such as whether a speed of the engine 106 was within a particular engine speed range at one or more instants of time of the period of time, whether a load of the engine 106 satisfied an engine load threshold at the one or more instants of time of the period of time, whether a temperature of the first engine bank 110-1 satisfied an engine bank temperature threshold at the one or more instants of time of the period of time, whether a temperature of the second engine bank 110-2 satisfied the engine bank temperature threshold at the one or more instants of time of the period of time, and/or whether a length of the period of time satisfies a time length threshold. The particular engine speed range may be 1780 to 1850 RPM, the engine load threshold may be greater than or equal to 99%, the engine bank temperature threshold may greater than or equal to 200 degrees C., and/or the time length threshold may be greater than or equal to 10 seconds. Accordingly, the monitoring system 104 may determine, based on determining that at least one engine operation criterion is satisfied for the period of time, that the engine 106 operated in the particular operation state for the period of time.

As further shown in FIG. 1B, and by reference number 130, the monitoring system 104 may determine (e.g., based on determining that the engine 106 operated in the particular operation state for the period of time) that the sensor data satisfies one or more data accuracy criteria. For example, the monitoring system 104 may determine, based on the sensor data, one or more temperatures of the first engine bank 110-1 at one or more instants of time of the period of time (e.g., when the engine 106 operated in the particular operation state) and/or one or more temperatures of the second engine bank 110-2 at the one or more instants of time of the period of time. The monitoring system 104 may determine whether a range (e.g., a mathematical range, which is a difference between a maximum value and a minimum value) of the one or more temperatures of the first engine bank 110-1 satisfies a temperature range threshold (e.g., is less than or equal to the temperature range threshold) and/or that a range of the one or more temperatures of the second engine bank 110-2 satisfies the temperature range threshold. Accordingly, the monitoring system 104 may determine, based on determining that at least one of the range of the one or more temperatures of the first engine bank 110-1 or the range of the one or more temperatures of the second engine bank 110-2 satisfies the temperature range threshold, that the sensor data is accurate (and therefore that the monitoring system 104 may perform one or more processing steps described herein in association with FIGS. 1C-1G). Alternatively, the monitoring system 104 may determine, based on determining that at least one of the range of the one or more temperatures of the first engine bank 110-1 or the range of the one or more temperatures of the second engine bank 110-2 does not satisfy the temperature range threshold, that the sensor data is inaccurate (and therefore that the monitoring system 104 may not perform any of the one or more processing steps described herein in association with FIGS. 1C-1G).

While the one or more data accuracy criteria are described herein as associated with temperatures of the first engine bank 110-1 and second engine bank 110-2, the data accuracy criteria may be associated with any other information included in the sensor data, such as one or more speeds of the engine 106, one or more loads of the engine 106, and/or one or more boost pressures of the engine 106, among other examples, during the period of time.

Figure 1C:
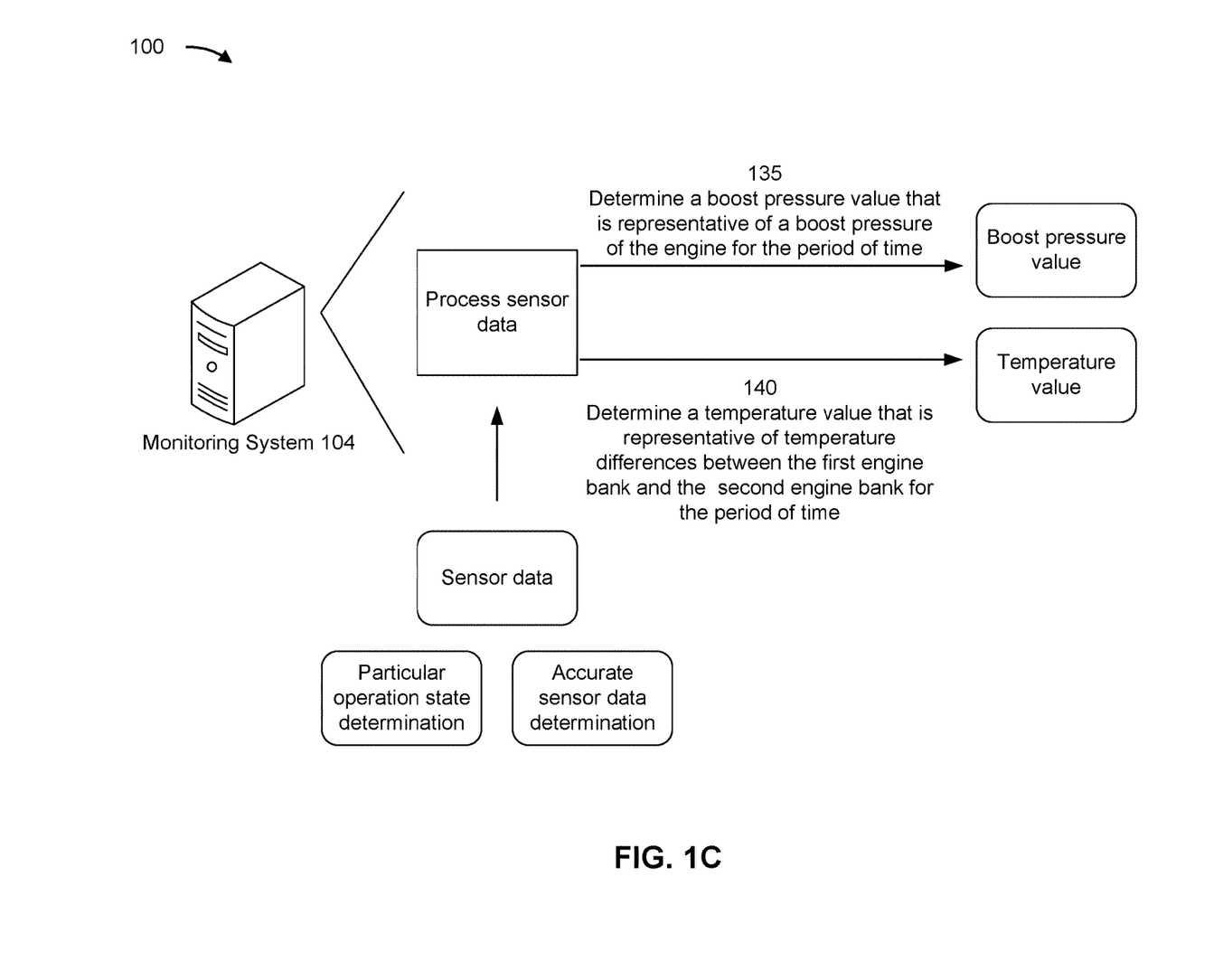

As shown in FIG. 1C, and by reference number 135, the monitoring system 104 may determine a boost pressure value (e.g., based on the sensor data and after determining that the engine operated in the particular operation state for the period of time and/or determining that the sensor data satisfies the one or more data accuracy criteria). The boost pressure value may be representative of a boost pressure of the engine 106 for the period of time (e.g., when the engine 106 operated in the particular operation state). For example, the monitoring system 104 may determine, based on the sensor data, one or more boost pressures of the engine 106 at one or more instants of time of the period of time. The monitoring system 104 may determine an average (e.g., a mean, a median, or a weighted average) of the one or more boost pressures and may identify the average as the boost pressure value for the period of time.

As further shown in FIG. 1C, and by reference number 140, the monitoring system 104 may determine a temperature value (e.g., based on the sensor data and after determining that the engine operated in the particular operation state for the period of time and/or determining that the sensor data satisfies the one or more data accuracy criteria). The temperature value may be representative of temperature differences between the first engine bank 110-1 and the second engine bank 110-2 for the period of time (e.g., when the engine 106 operated in the particular operation state). For example, the monitoring system 104 may determine, for one or more instants of time of the period of time, respective differences between a temperature of the first engine bank 110-1 and a temperature of the second engine bank 110-2. The monitoring system 104 may determine an average (e.g., a mean, a median, or a weighted average) of the one or more respective differences (e.g., an average difference between the temperatures of the first engine bank 110-1 and the temperatures of the second engine bank 110-2) and may identify the average as the temperature value for the period of time. In some implementations, the monitoring system 104 may apply one or more mathematical functions to modify the average (e.g., round the average to a nearest whole number) and may identify the modified average as the temperature value for the period of time.

Figure 1D:
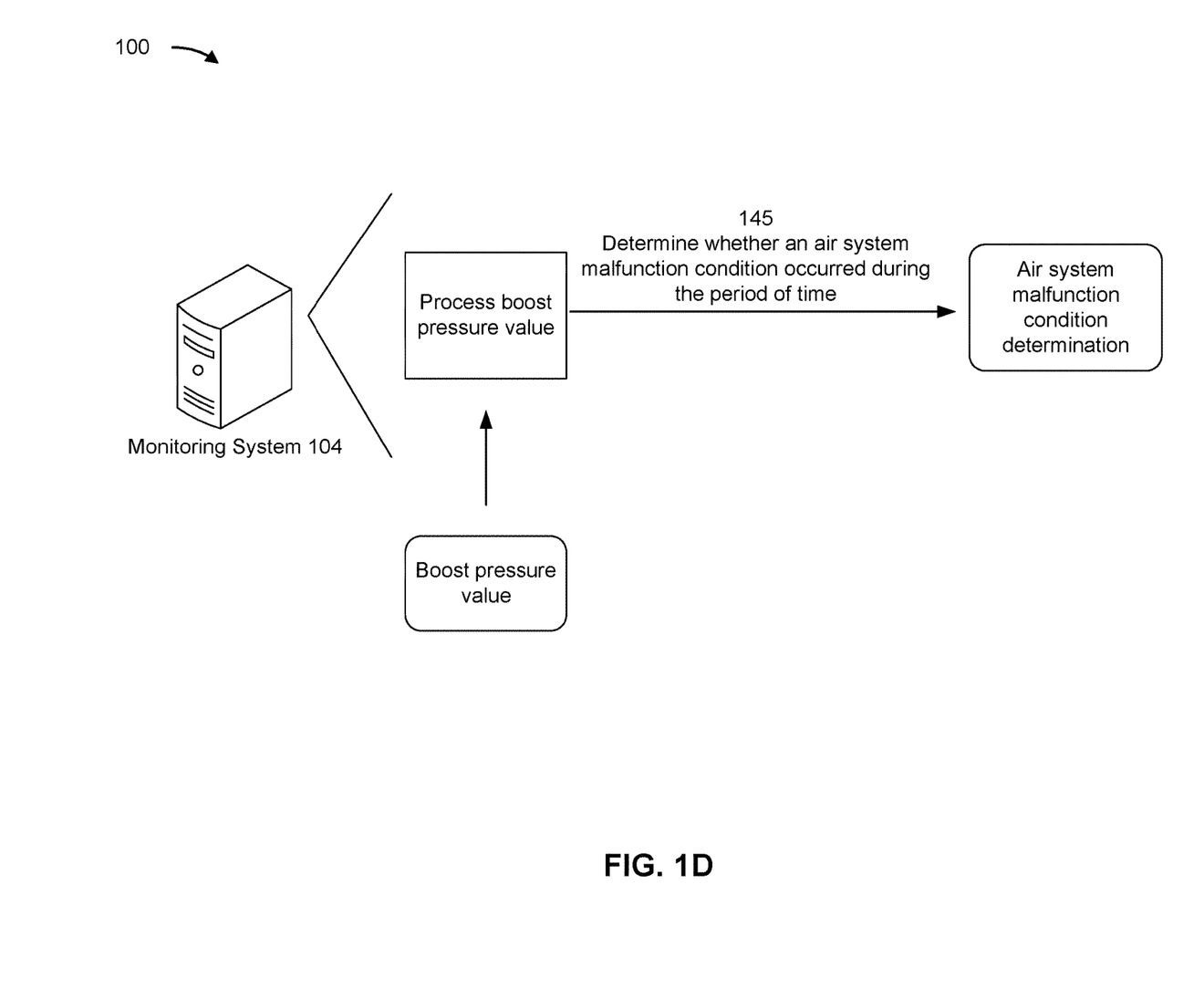

As shown in FIG. 1D, and by reference number 145, the monitoring system 104 may determine whether an air system malfunction condition occurred during the period of time (e.g., when the engine 106 operated in the particular operation state). An air system malfunction condition may include an improper functioning or failure of the intake manifold 114 and/or another component of an air system of the engine 106. For example, the monitoring system 104 may determine whether the boost pressure value (e.g., that was determined by the monitoring system 104, as described herein in relation to FIG. 1C and reference number 135) satisfies (e.g., is greater than or equal to) a boost pressure threshold. Accordingly, the monitoring system 104 may determine, based on determining that the boost pressure value satisfies the boost pressure threshold, that an air system malfunction condition did not occur during the period of time (and therefore that the monitoring system 104 may perform one or more processing steps described herein in association with FIGS. 1E-1F). Alternatively, the monitoring system 104 may determine, based on determining that the boost pressure value does not satisfy the boost pressure threshold, that an air system malfunction condition occurred during the period of time (and therefore that the monitoring system 104 may not perform any of the one or more processing steps described herein in association with FIGS. 1E-1F).

Figure 1E:
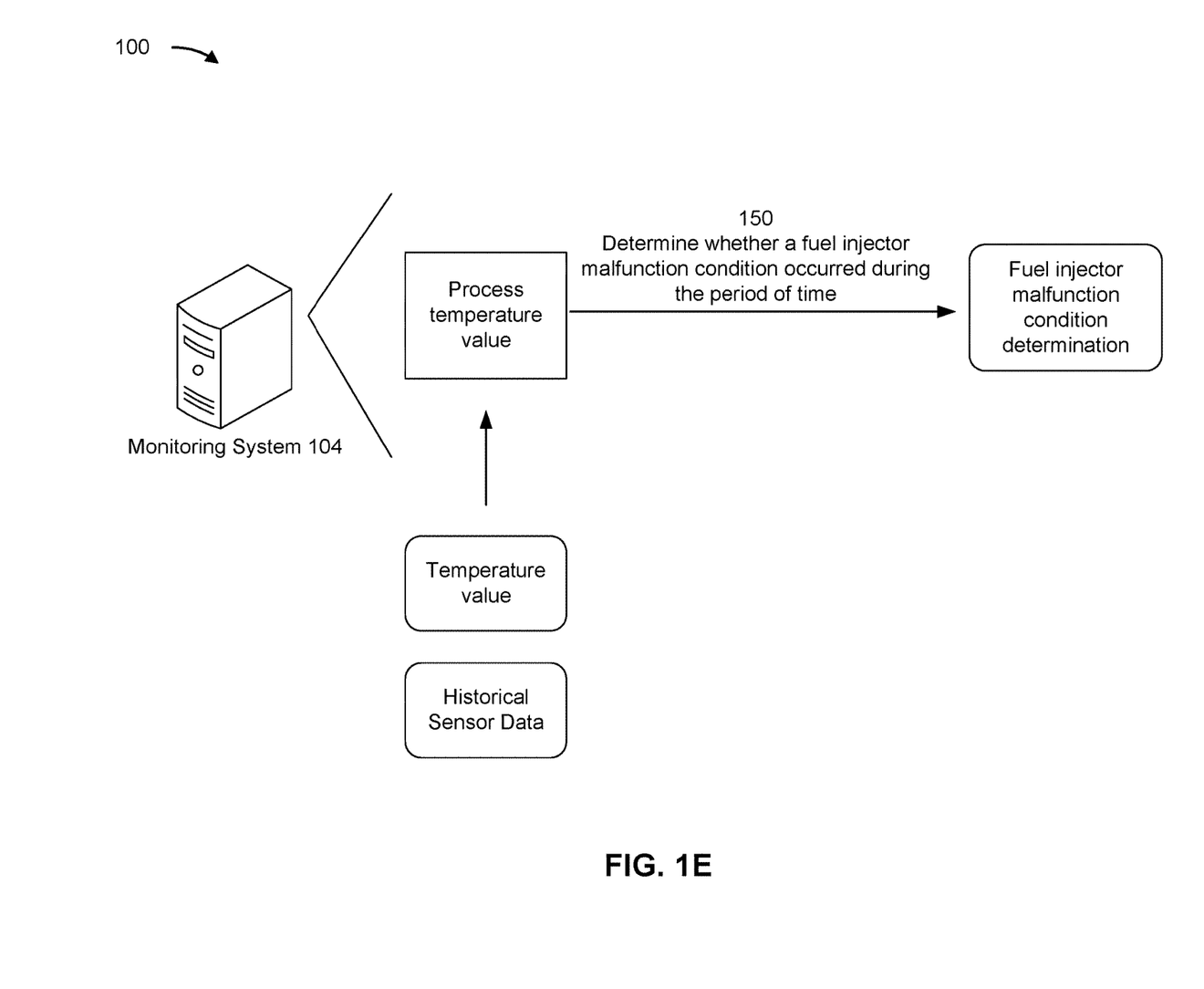

As shown in FIG. 1E, and by reference number 150, the monitoring system 104 may determine whether a fuel injector malfunction condition occurred during the period of time (e.g., when the engine 106 operated in the particular operation state). A fuel injector malfunction condition may include an improper functioning or failure of one or more of the plurality of fuel injectors 112.

In some implementations, the monitoring system 104 may determine, based on historical sensor data (e.g., sensor data that was previously obtained by the monitoring system 104, such as over a previous number of hours, days, weeks, or months), a historical temperature value. The historical temperature value may be representative of temperature differences between the first engine bank 110-1 and the second engine bank 110-2 for one or more prior periods of time when the engine operated in the particular operation state. For example, the monitoring system 104 may determine one or more respective temperature values (e.g., respective average differences between the temperatures of the first engine bank 110-1 and the temperatures of the second engine bank 110-2) for the one or more prior periods and may determine an average (e.g., a mean, a median, or a weighted average) of the one or more respective temperature values. The monitoring system 104 may identify the average as the historical temperature value for the one or more prior periods.

Accordingly, the monitoring system 104 may determine whether the fuel injector malfunction condition occurred during the period of time based on the temperature value and/or the historical temperature value. For example, the monitoring system 104 may determine a difference between the temperature value and the historical temperature value and may determine whether the difference satisfies (e.g., is greater than or equal to) a temperature difference threshold. The monitoring system 104 may determine, based on determining the difference satisfies the temperature difference threshold, that the fuel injector malfunction condition occurred during the period of time (and therefore that the monitoring system 104 may perform one or more processing steps described herein in association with FIGS. 1F-1G). Alternatively, the monitoring system 104 may determine, based on determining that the difference does not satisfy the temperature difference threshold, that the fuel injector malfunction condition did not occur during the period of time (and therefore that the monitoring system 104 may not perform any of the one or more processing steps described herein in association with FIG. 1F).

Figure 1F:
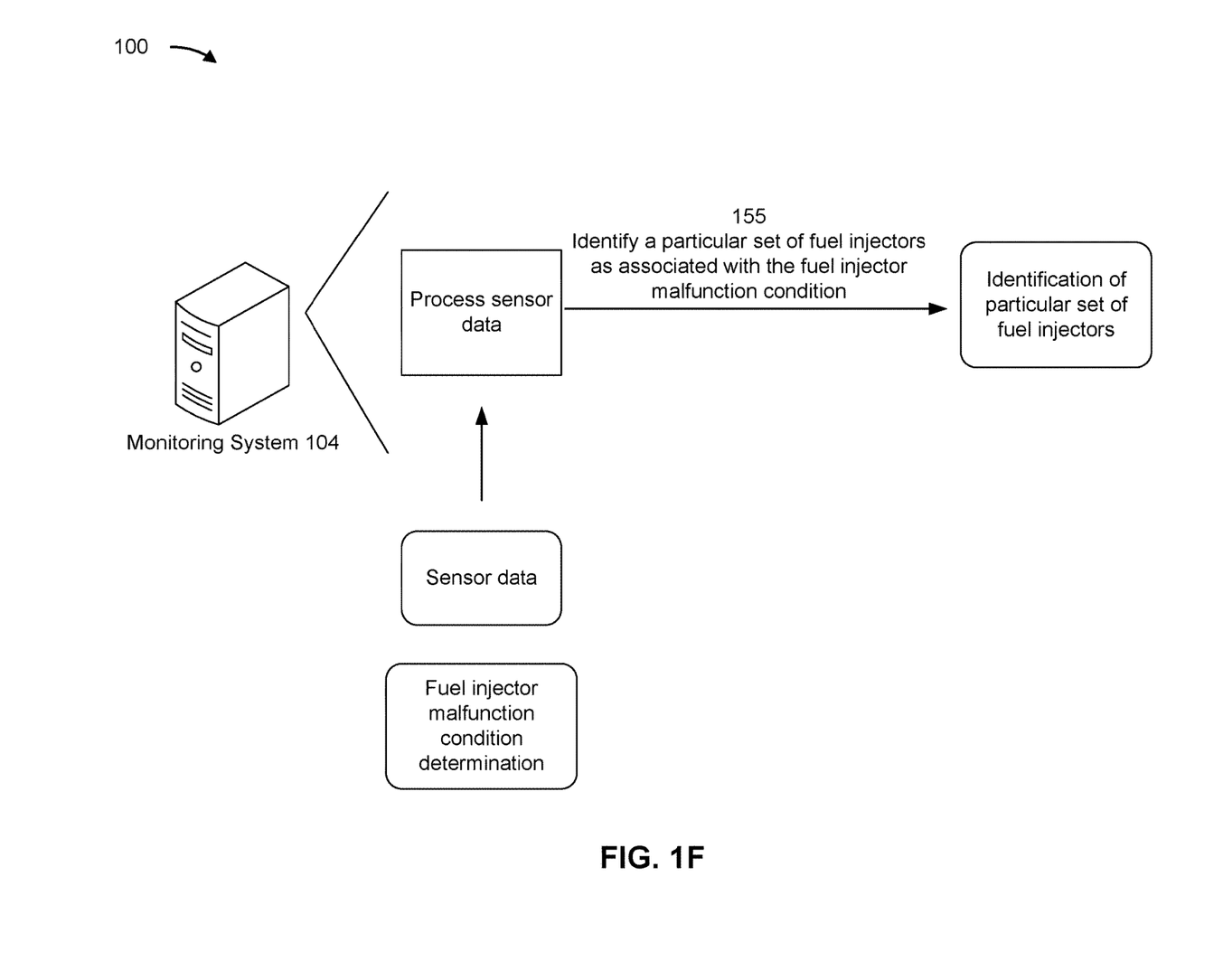

As shown in FIG. 1F, and by reference number 155, the monitoring system 104 may identify (e.g., based on determining that that the fuel injector malfunction condition occurred during the period of time) a particular set of fuel injectors 112, of the first set of fuel injectors 112-1 and the second set of fuel injectors 112-2, as associated with the fuel injector malfunction condition. In this case, at least one fuel injector 112, of the particular set of fuel injectors 112, may be functioning improperly or may have failed.

In some implementations, the monitoring system 104 may determine, based on the sensor data, a first engine bank temperature value. The first engine bank temperature value may be representative of temperature differences between the first engine bank 110-1 for the period of time (e.g., the current period of time) when the engine 106 operated in the particular operation state and the first engine bank 110-1 for the one or more prior periods of time when the engine 106 operated in the particular operation state. For example, the monitoring system 104 may determine, for one or more instants of time of the period of time, respective temperatures of the first engine bank 110-1 and may determine an average (e.g., a mean, a median, or a weighted average) of the one or more respective temperatures (e.g., an average temperature of the first engine bank 110-1). The monitoring system 104 may identify the average as a current average temperature of the first engine bank 110-1 for the period of time. In a similar manner, the monitoring system 104 may determine respective average temperatures of the first engine bank 110-1 for the one or more prior periods of time and may determine an average (e.g., a mean, a median, or a weighted average) of the one or more respective average temperatures. The monitoring system 104 may identify the average as a historic average temperature of the first engine bank 110-1 for the one or more prior periods of time. The monitoring system 104 may determine a difference between the current average temperature of the first engine bank 110-1 and the historic average temperature of the first engine bank 110-1 and may identify the difference as the first engine bank temperature value.

In some implementations, the monitoring system 104 may determine, based on the sensor data, a second engine bank temperature value. The second engine bank temperature value may be representative of temperature differences between the second engine bank 110-2 for the period of time (e.g., the current period of time) when the engine 106 operated in the particular operation state and the second engine bank 110-2 for the one or more prior periods of time when the engine 106 operated in the particular operation state. For example, the monitoring system 104 may determine, for one or more instants of time of the period of time, respective temperatures of the second engine bank 110-2 and may determine an average (e.g., a mean, a median, or a weighted average) of the one or more respective temperatures (e.g., an average temperature of the second engine bank 110-2). The monitoring system 104 may identify the average as a current average temperature of the second engine bank 110-2 for the period of time. In a similar manner, the monitoring system 104 may determine respective average temperatures of the second engine bank 110-2 for the one or more prior periods of time and may determine an average (e.g., a mean, a median, or a weighted average) of the one or more respective average temperatures. The monitoring system 104 may identify the average as a historic average temperature of the second engine bank 110-2 for the one or more prior periods of time. The monitoring system 104 may determine a difference between the current average temperature of the second engine bank 110-2 and the historic average temperature of the second engine bank 110-2 and may identify the difference as the second engine bank temperature value.

Accordingly, the monitoring system 104 may identify, based on the first engine bank temperature value and the second engine bank temperature value, the particular set of fuel injectors 112, of the first set of fuel injectors 112-1 and the second set of fuel injectors 112-2, as associated with the fuel injector malfunction condition. For example, the monitoring system 104 determine that the first engine bank temperature value is greater than the second engine bank temperature value and therefore may identify the first set of fuel injectors 112-2 as the particular set of fuel injectors 112. As another example, the monitoring system 104 determine that the second engine bank temperature value is greater than the first engine bank temperature value and therefore may identify the second set of fuel injectors 112-2 as the particular set of fuel injectors 112.

Figure 1G:
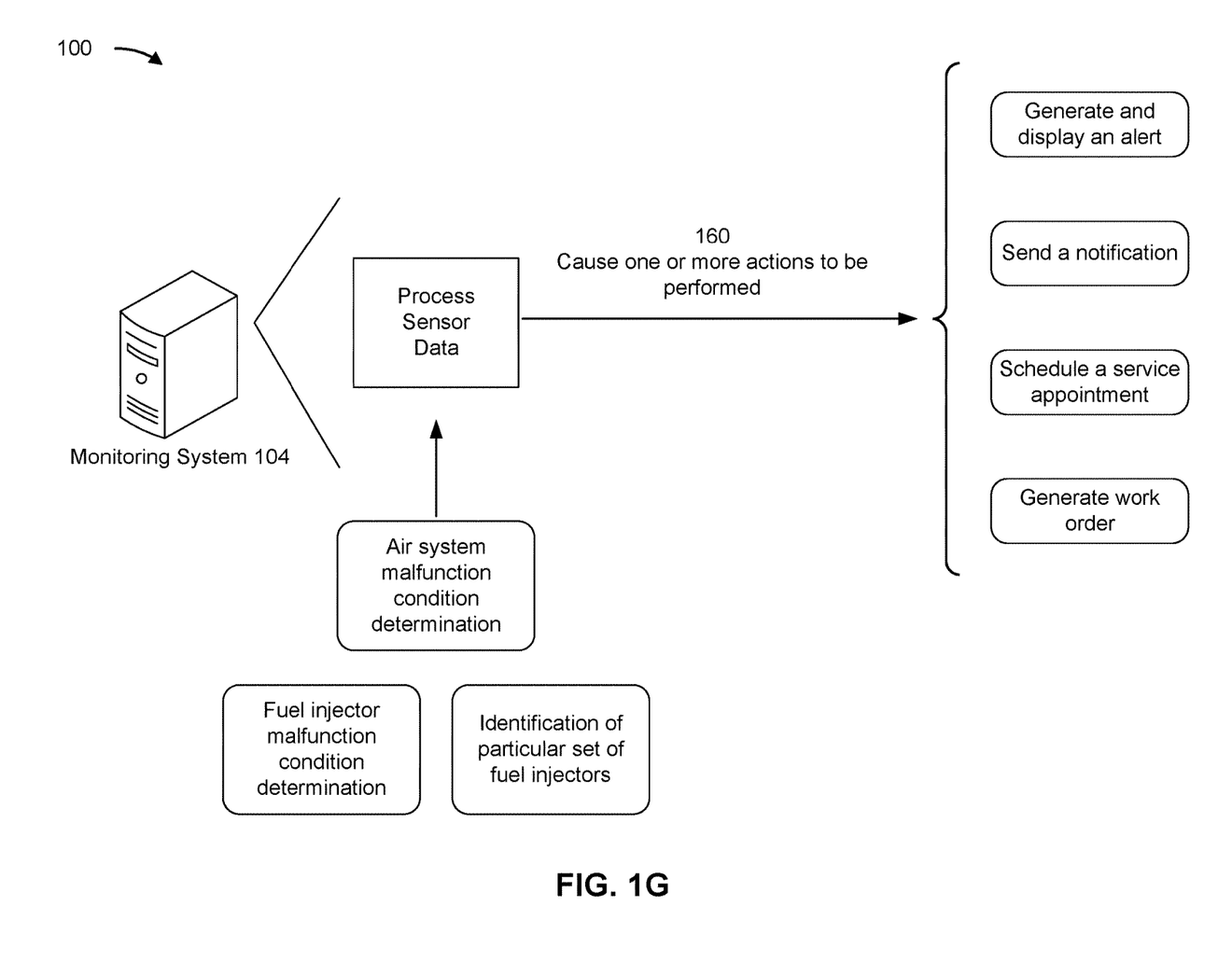

As shown in FIG. 1G, and by reference number 160, the monitoring system 104 may cause one or more actions to be performed (e.g., based on determining whether an air system malfunction condition occurred during the period of time, determining whether a fuel injector malfunction condition occurred during the period of time, and/or identifying a particular set of fuel injectors associated with a fuel injector malfunction condition).

In some implementations, causing the one or more actions to be performed includes causing information to be sent to a client device to allow the information to be displayed on a display screen of the client device. The information may indicate, for example, whether an air system malfunction condition occurred during the period of time, whether a fuel injector malfunction condition occurred during the period of time, and/or whether a particular set of fuel injectors is associated with a fuel injector malfunction condition. For example, the monitoring system 104 may generate an alert that includes the information and may provide the alert to the client device to allow the alert to be displayed (e.g., via a user interface) on the display screen of the client device. As another example, the monitoring system 104 may generate a notification that includes the information and may send the notification (e.g., as a message) to an electronic messaging account (e.g., an email account, a text messaging account, an instant messaging account, and/or other messaging account) to cause the client device to display the notification (e.g., when the client device runs an application associated with the electronic messaging account).

In some implementations, causing the one or more actions to be performed includes causing an appointment to be automatically scheduled for servicing of the machine 102 (e.g., to check the plurality of fuel injectors 112 or the particular set of fuel injectors 112 for the fuel injector malfunction condition) or causing a work order to be generated for servicing of the machine 102. For example, the monitoring system 104 may send a notification, in a similar manner as that described above, to a client device associated with scheduling service of the machine 102 to cause the client device to schedule a service appointment or to generate a work order to service the machine 102.

As indicated above, FIGS. 1A-1G are provided as an example. Other examples may differ from what is described with regard to FIGS. 1A-1G.

Figure 2:
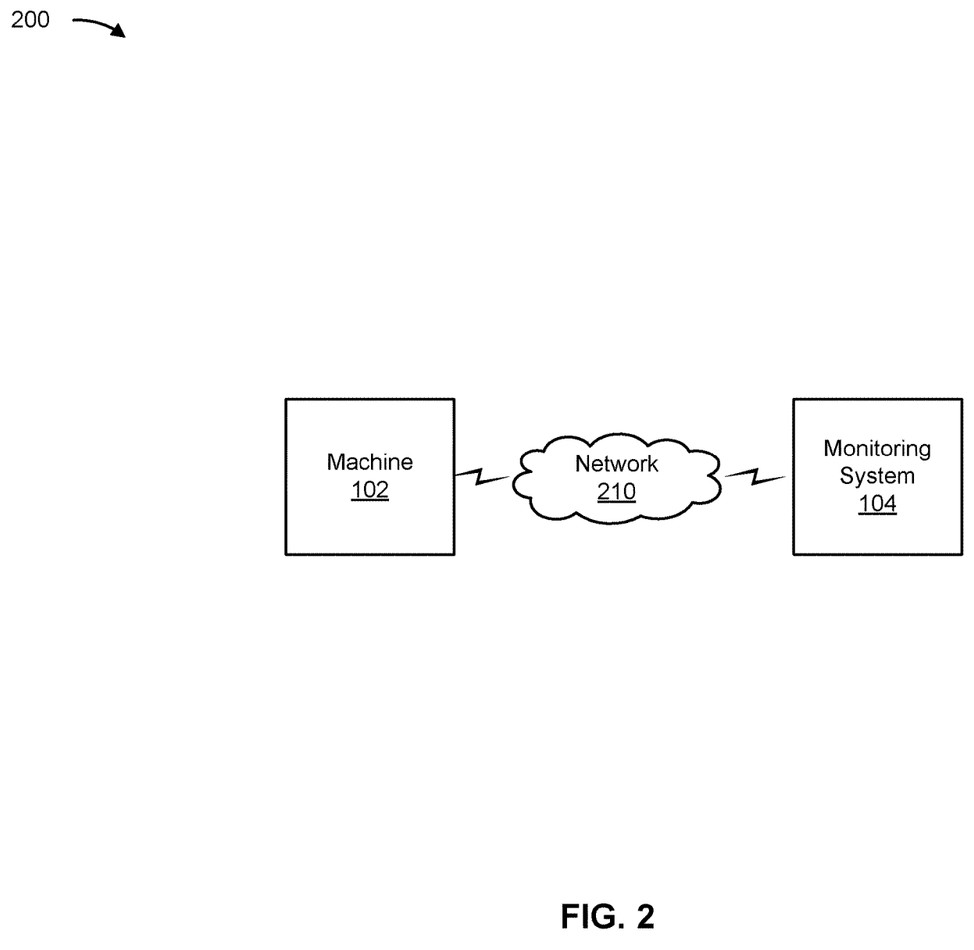
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the machine 102, the monitoring system 104, and/or a network 210. Devices and/or elements of environment 200 may interconnect via wired connections and/or wireless connections.

The machine 102 includes any machine that performs an operation associated with an industry such as, for example, mining, construction, farming, transportation, or any other industry (e.g., as described herein in relation to FIG. 1A). The machine 102 may include a communication component that is configured to communicate sensor data associated with the engine 106 of the machine 102 to the monitoring system 104 (e.g., via the network 210).

The monitoring system 104 includes one or more devices capable of receiving, generating, storing, processing, providing, and/or routing information, as described elsewhere herein. The monitoring system 104 may include a communication device and/or a computing device. For example, the monitoring system 104 may include a server, such as an application server, a client server, a web server, a database server, a host server, a proxy server, a virtual server (e.g., executing on computing hardware), or a server in a cloud computing system. In some implementations, the monitoring system 104 includes computing hardware used in a cloud computing environment. The monitoring system 104 may include one or more processors (e.g., one or more of a central processing unit, a graphics processing unit, a microprocessor, a controller, a microcontroller, a digital signal processor, a field-programmable gate array, an application-specific integrated circuit, and/or another type of processing component), one or more memories (e.g., one or more of random access memory (RAM); read only memory (ROM); a hard disk drive; another type of memory, such as a flash memory, a magnetic memory, and/or an optical memory; and/or a non-transitory computer-readable medium), and/or one or more networking components (e.g., one or more communication components).

Network 210 includes one or more wired and/or wireless networks. For example, network 210 may include a cellular network, a public land mobile network (PLMN), a local area network (LAN), a wide area network (WAN), a private network, the Internet, and/or a combination of these or other types of networks. The network 210 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
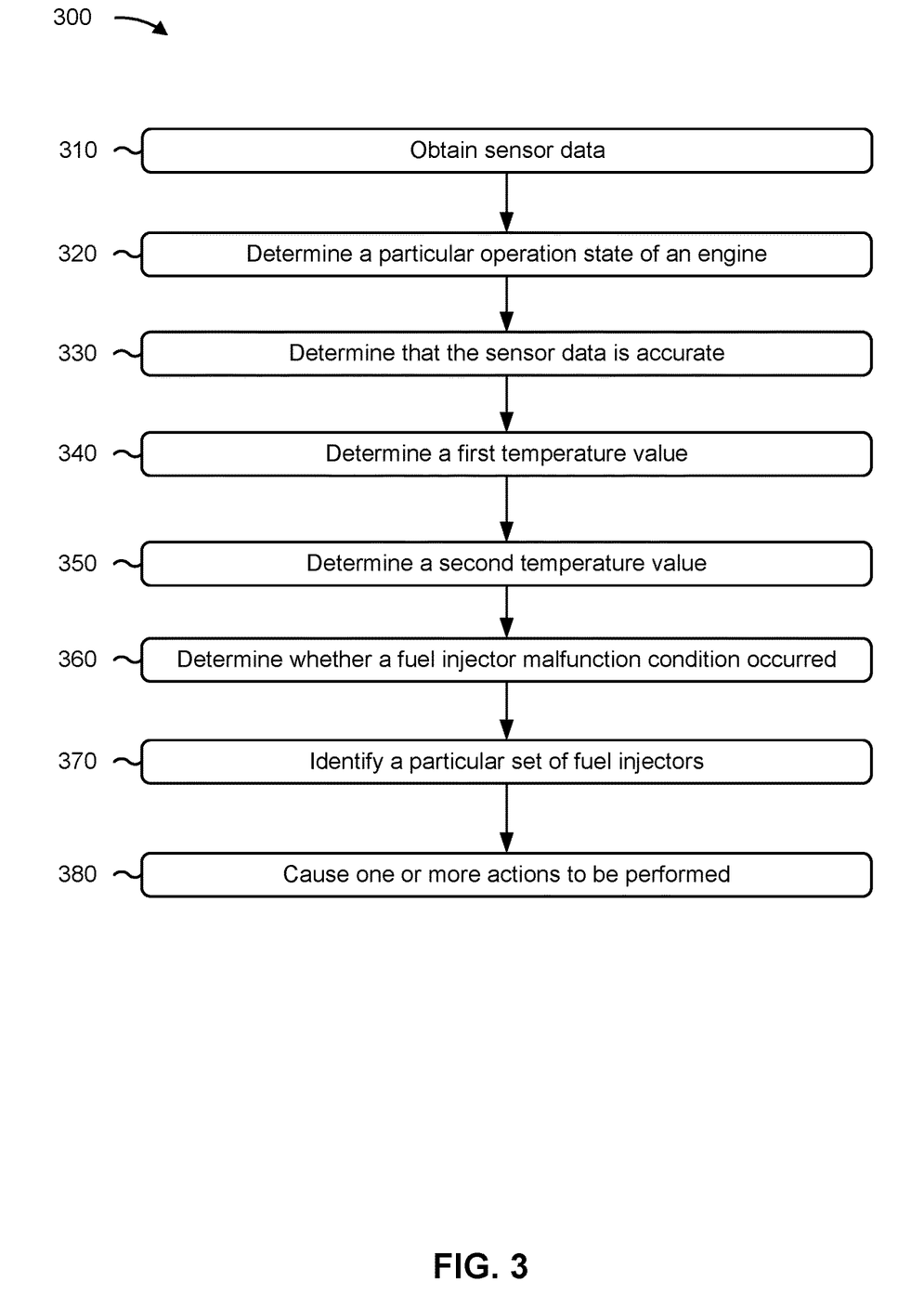
FIG. 3 is a flowchart of an example processes relating to identifying an engine bank with a malfunctioning fuel injector.

FIG. 3 is a flowchart of an example process 300 associated with identifying an engine bank with a malfunctioning fuel injector. One or more process blocks of FIG. 3 may be performed by a monitoring system (e.g., monitoring system 104) and/or may be performed by another device or a group of devices separate from or including the monitoring system, such as the machine 102.

As shown in FIG. 3, process 300 may include obtaining sensor data (block 310). As further shown in FIG. 3, process 300 may include determining a particular operation state of an engine (block 320). As further shown in FIG. 3, process 300 may include determining that the sensor data is accurate (block 330). As further shown in FIG. 3, process 300 may include determining a first temperature value (block 340). As further shown in FIG. 3, process 300 may include determining a second temperature value (block 350). As further shown in FIG. 3, process 300 may include determining whether a fuel injector malfunction condition occurred (e.g., based on the first temperature value and the second temperature value) (block 360). As further shown in FIG. 3, process 300 may include identifying a particular set of fuel injectors (e.g., that are associated with a fuel injector malfunction condition) (block 370). As further shown in FIG. 3, process 300 may include causing one or more actions to be performed (block 380).

Although FIG. 3 shows example blocks of process 300, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The above-described techniques allow a monitoring system 104 to determine that a fuel injector malfunction condition associated with an engine 106 occurred during a period of time and/or to identify a particular set of fuel injectors 112, that is included in a particular engine bank 110 of the engine 106, as associated with the fuel injector malfunction condition. Accordingly, the monitoring system 104 perform one or more actions to provide information indicating the fuel injector malfunction condition and/or the particular set of fuel injectors 112 to a user of a client device, such as a technician that services the engine 106. This reduces an amount of time and/or resources (e.g., computing resources, such as processing resources, memory resources, communication resources, and/or power resources, among other examples) to service and/or maintain the engine 106 by eliminating a need to perform diagnostics to determine that a fuel injector malfunction condition occurred and/or to identify the particular set of fuel injectors 112.

Further, the monitoring system 104 minimizes a likelihood of an incorrect determination that a fuel injector malfunction condition occurred during a period of time and/or an incorrect identification of a particular set of fuel injectors 112 associated with the fuel injector malfunction condition by processing current and historical sensor data associated with operation of the engine 106 (e.g., that incorporates real-world performance parameters associated with operation of the engine 106). This improves an accuracy of the monitoring system 104 as compared to using other techniques (e.g., making determinations and/or identifications based on a model performance of the engine 106).

What is claimed is:

1. A monitoring system, comprising:
one or more memories; and
one or more processors, coupled to the one or more memories, configured to:
obtain sensor data associated with operation of an engine of a machine,
wherein the engine includes a first engine bank and a second engine bank;
determine, based on the sensor data, that the engine operated in a particular operation state for a period of time;
determine, based on determining that the engine operated in the particular operation state for the period of time, that the sensor data satisfies one or more data accuracy criteria;
determine, based on the sensor data and determining that the sensor data satisfies the one or more data accuracy criteria, a first temperature value that is representative of temperature differences between the first engine bank and the second engine bank for the period of time;
determine, based on determining that the sensor data satisfies the one or more data accuracy criteria, a second temperature value that is representative of temperature differences between the first engine bank and the second engine bank for one or more prior periods of time when the engine operated in the particular operation state;
determine, based on the first temperature value and the second temperature value, that a fuel injector malfunction condition occurred during the period of time;
identify, based on determining that the fuel injector malfunction condition occurred during the period of time and based on the one or more prior periods of time, a particular set of fuel injectors as associated with the fuel injector malfunction condition,
wherein the particular set of fuel injectors includes all fuel injectors included in the first engine bank or the second engine bank; and
cause, based on identifying the particular set of fuel injectors, one or more actions to be performed.

2. The monitoring system of claim 1, wherein the sensor data comprises at least one of:
information concerning a speed of the engine;
information concerning a load of the engine;
information concerning a boost pressure of the engine;
information concerning an exhaust gas temperature associated with the first engine bank; or
information concerning an exhaust gas temperature associated with the second engine bank.

3. The monitoring system of claim 1, wherein the one or more processors, to determine that the engine operated in the particular operation state for the period of time, are configured to:
determine, based on the sensor data, that a speed of the engine was within a particular engine speed range at one or more instants of time of the period of time;
determine, based on the sensor data, that a load of the engine satisfied an engine load threshold at the one or more instants of time of the period of time;
determine, based on the sensor data, that a temperature of the first engine bank satisfied an engine bank temperature threshold at the one or more instants of time of the period of time;
determine, based on the sensor data, that a temperature of the second engine bank satisfied the engine bank temperature threshold at the one or more instants of time of the period of time; and
determine that a length of the period of time satisfies a time length threshold.

4. The monitoring system of claim 3, wherein at least one of:
the particular engine speed range is 1780 to 1850 revolutions per minute;
the engine load threshold is greater than or equal to 99%;
the engine bank temperature threshold is greater than or equal to 200 degrees Celsius; or
the time length threshold is greater than or equal to 10 seconds.

5. The monitoring system of claim 1, wherein the one or more processors, to determine that the sensor data satisfies the one or more data accuracy criteria, are configured to:
identify, based on the sensor data, one or more temperatures of the first engine bank at one or more instants of time of the period of time;
identify, based on the sensor data, one or more temperatures of the second engine bank at the one or more instants of time of the period of time;

determine that a range of the one or more temperatures of the first engine bank satisfies a temperature range threshold; and determine that a range of the one or more temperatures of the second engine bank satisfies the temperature range threshold.

6. The monitoring system of claim 1, wherein the one or more processors are further configured to:

determine, based on determining that the sensor data satisfies the one or more data accuracy criteria, and prior to determining the first temperature value, a boost pressure value that is representative of a boost pressure of the engine for the period of time; and determine that the boost pressure value satisfies a boost pressure threshold.

7. The monitoring system of claim 1, wherein the one or more processors, to determine the first temperature value, are configured to:

determine, for one or more instants of time of the period of time, respective differences between a temperature of the first engine bank and a temperature of the second engine bank;

determine, based on the respective differences, an average difference between the temperature of the first engine bank and the temperature of the second engine bank; and determine, based on the average difference, the first temperature value.

8. The monitoring system of claim 1, wherein the one or more processors, to determine that the fuel injector malfunction condition occurred during the period of time, are configured to:

determine a difference between the first temperature value and the second temperature value;

determine that the difference satisfies a temperature difference threshold; and determine, based on determining that the difference satisfies the temperature difference threshold, that the fuel injector malfunction condition occurred during the period of time.

9. The monitoring system of claim 1, wherein the one or more processors, to cause the one or more actions to be performed, are configured to:

cause information related to determining that the fuel injector malfunction condition occurred during the period of time to be sent to a client device to allow the information to be displayed on a display screen of the client device.

10. The monitoring system of claim 1, wherein the one or more processors, to identify the particular set of fuel injectors, are configured to:

determine, based on determining that the fuel injector malfunction condition occurred during the period of time, a third temperature value that is representative of temperature differences between the first engine bank for the period of time and the first engine bank for the one or more prior periods of time;

determine, based on determining that the fuel injector malfunction condition occurred during the period of time, a fourth temperature value that is representative of temperature differences between the second engine bank for the period of time and the second engine bank for the one or more prior periods of time; and identify, based on the third temperature value and the fourth temperature value, the particular set of fuel injectors, as associated with the fuel injector malfunction condition, wherein the first engine bank includes a first set of fuel injectors, wherein the second engine bank includes a second set of fuel injectors, and wherein one of:

the first set of fuel injectors are identified as the particular set of fuel injectors based on the third temperature value being greater than the fourth temperature value, or the second set of fuel injectors are identified as the particular set of fuel injectors based on the fourth temperature value being greater than the third temperature value.

11. The monitoring system of claim 1, wherein the one or more processors, to cause the one or more actions to be performed, are configured to:

cause information identifying the particular set of fuel injectors as associated with the fuel injector malfunction condition to be sent to a client device to allow the information to be displayed on a display screen of the client device.

12. The monitoring system of claim 1, wherein the one or more processors, to cause the one or more actions to be performed, are configured to:

cause an appointment to be automatically scheduled for servicing of the machine to check the particular set of fuel injectors for the fuel injector malfunction condition.

13. A method, comprising:

obtaining, by a monitoring system, sensor data associated with operation of an engine of a machine, wherein the engine includes a first engine bank with a first set of fuel injectors and a second engine bank with a second set of fuel injectors;

determining, by the monitoring system and based on the sensor data, that the engine operated in a particular operation state for a period of time;

determining, by the monitoring system and based on the sensor data and determining that the engine operated in the particular operation state for the period of time, a first temperature value that is representative of temperature differences between the first engine bank and the second engine bank for the period of time;

identifying, by the monitoring system, a historic average temperature of the second engine bank for one or more prior periods of time when the engine operated in the particular operation state;

determining, by the monitoring system, a second temperature value based on the historic average temperature of the second engine bank;

determining, based on the first temperature value and the second temperature value, whether a fuel injector malfunction condition occurred during the period of time; and causing, based on determining whether the fuel injector malfunction condition occurred during the period of time, one or more actions to be performed.

14. The method of claim 13, wherein determining the first temperature value comprises:

determining an average difference between a temperature of the first engine bank and a temperature of the second engine bank at one or more instants of time of the period of time; and determining, based on the average difference, the first temperature value.

15. The method of claim 13, wherein determining whether the fuel injector malfunction condition occurred during the period of time comprises:
   determining a difference between the first temperature value and the second temperature value; and
   determining:
      that the fuel injector malfunction condition has not occurred during the period of time, based on the difference not satisfying a temperature difference threshold, or
      that the fuel injector malfunction condition occurred during the period of time, based on the difference satisfying the temperature difference threshold.

16. The method of claim 13, further comprising:
   determining, based on determining that the fuel injector malfunction condition occurred during the period of time, a third temperature value that is representative of temperature differences between the first engine bank for the period of time and the first engine bank for the one or more prior periods of time;
   determining, based on determining that the fuel injector malfunction condition occurred during the period of time, a fourth temperature value that is representative of temperature differences between the second engine bank for the period of time and the second engine bank for the one or more prior periods of time; and
   identifying, based on the third temperature value and the fourth temperature value, a particular set of fuel injectors, of the first set of fuel injectors and the second set of fuel injectors, as associated with the fuel injector malfunction condition,
      wherein one of:
         the first set of fuel injectors are identified as the particular set of fuel injectors, based on the third temperature value being greater than the fourth temperature value, or
         the second set of fuel injectors are identified as the particular set of fuel injectors, based on the fourth temperature value being greater than the third temperature value.

17. A non-transitory computer-readable medium storing a set of instructions, the set of instructions comprising:
   one or more instructions that, when executed by one or more processors of a monitoring system, cause the monitoring system to:
      obtain sensor data associated with operation of an engine of a machine,
         wherein the engine includes a first engine bank with a first set of fuel injectors and a second engine bank with a second set of fuel injectors;
      determine, based on the sensor data, a first temperature value that is representative of temperature differences between the first engine bank and the second engine bank for a period of time when the engine operated in a particular operation state;
      determine a second temperature value that is representative of temperature differences between the first engine bank and the second engine bank for one or more prior periods of time when the engine operated in the particular operation state;
      determine, based on the first temperature value and the second temperature value, that a fuel injector malfunction condition occurred during the period of time;
      identify, based on determining that the fuel injector malfunction condition occurred during the period of time and based on the one or more prior periods of time, a particular set of fuel injectors as associated with the fuel injector malfunction condition,
         wherein the particular set of fuel injectors includes all fuel injectors included in the first engine bank or the second engine bank; and
      cause, based on identifying the particular set of fuel injectors, one or more actions to be performed.

18. The non-transitory computer-readable medium of claim 17, wherein the one or more instructions, that cause the monitoring system to determine that the fuel injector malfunction condition occurred during the period of time, cause the monitoring system to:
   determine a difference between the first temperature value and the second temperature value; and
   determine, based on the difference satisfying a temperature difference threshold, that the fuel injector malfunction condition occurred during the period of time.

19. The non-transitory computer-readable medium of claim 17, wherein the one or more instructions, that cause the monitoring system to identify the particular set of fuel injectors, cause the monitoring system to:
   determine, based on determining that the fuel injector malfunction condition occurred during the period of time, a third temperature value that is representative of temperature differences between the first engine bank for the period of time and the first engine bank for the one or more prior periods of time;
   determine, based on determining that the fuel injector malfunction condition occurred during the period of time, a fourth temperature value that is representative of temperature differences between the second engine bank for the period of time and the second engine bank for the one or more prior periods of time; and
   identify, based on the third temperature value and the fourth temperature value, the particular set of fuel injectors, as associated with the fuel injector malfunction condition,
      wherein the first engine bank includes a first set of fuel injectors,
      wherein the second engine bank includes a second set of fuel injectors, and
      wherein one of:
         the first set of fuel injectors are identified as the particular set of fuel injectors based on the third temperature value being greater than the fourth temperature value, or
         the second set of fuel injectors are identified as the particular set of fuel injectors based on the fourth temperature value being greater than the third temperature value.

20. The method of claim 13, wherein determining the second temperature value comprises:
   determining the second temperature based on a difference between a current average temperature of the second engine bank and the historic average temperature of the second engine bank.

* * * * *